(12) United States Patent
Young et al.

(10) Patent No.: US 7,472,182 B1
(45) Date of Patent: Dec. 30, 2008

(54) DATA COLLECTION POLICY FOR STORAGE DEVICES

(75) Inventors: Eric Young, Alexandria, VA (US); Jay Stevens, Fairfax Station, VA (US); David Barta, West Roxbury, MA (US); Joseph Berry, Baltimore, MD (US); Ilya Liubovich, Shrewsbury, MA (US); Serge Marokhovsky, Upton, MA (US); Douglas Leech, Fairfax, VA (US)

(73) Assignee: EMC Corporation, Hopkinton, MA (US)

( * ) Notice: Subject to any disclaimer, the term of this patent is extended or adjusted under 35 U.S.C. 154(b) by 992 days.

(21) Appl. No.: 10/334,964

(22) Filed: Dec. 31, 2002

(51) Int. Cl.
   *G06F 15/173* (2006.01)
(52) U.S. Cl. ............ 709/224; 709/225; 709/227; 707/200; 702/186; 702/187
(58) Field of Classification Search ............ 709/224, 709/225, 227, 106; 707/200; 702/186, 187
   See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,745,207 B2 * | 6/2004 | Reuter et al. | 707/200 |
| 6,996,670 B2 * | 2/2006 | Delaire et al. | 711/114 |
| 7,058,545 B2 * | 6/2006 | Chang et al. | 702/186 |

OTHER PUBLICATIONS

U.S. Appl. No. 09/431,758, filed Nov. 01, 1999, Joseph Murphy, et al.

\* cited by examiner

*Primary Examiner*—John Follansbee
*Assistant Examiner*—Glenford Madamba
(74) *Attorney, Agent, or Firm*—Muirhead and Saturnelli LLC

(57) ABSTRACT

Collecting data for a storage area network includes providing a plurality of agents that collect data from objects of the storage area network, providing a plurality of data collection policies, where each of the policies indicates a type of data to be collected and a frequency of collection, and applying the policies to the agents, where the agents collect data according to the type of data and the frequencies indicated by the data collection policies. At least one of the agents may have a plurality of data collection policies applied thereto to cause the at least one agent to collect the types of data at the frequencies indicated by the merge of all of the data collection policies applied to the at least one agent. Merging the data collection policies may be performed by the at least one of the agents that receives the data collection policies or may be performed by an entity other than the at least one of the agents.

26 Claims, 14 Drawing Sheets

DATA COLLECTION POLICY FOR STORAGE DEVICES

BACKGROUND OF THE INVENTION

1. Technical Field

This application relates to the field of computer storage devices, and more particularly to the field of monitoring and controlling operation of objects in a system containing storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

A large system may consist of a plurality of hosts, a plurality of storage devices, and a plurality of switches that direct data between the hosts and the storage devices. Such a system, called a storage area network (SAN), provides for certain efficiencies and optimizations when the storage devices and hosts are used together. However, it may be difficult to monitor and control the objects of the SAN. One solution to this is to use special software provided by EMC Corporation of Hopkinton, Mass. for monitoring and controlling the objects. The EMC software runs on one or more hosts to monitor the SAN. The software also includes agents, which are separate programs that collect data from each of the objects of the SAN and report back to the EMC software running on the one or more hosts.

The agents used with the EMC software may be customized for each object and application. Thus, the data collection frequencies and type of data collected may be "built in" for each of the agents. However, in some cases, a user of the EMC software may want to change the frequency and type of data collected. A user may also want to standardize data collection across groups of objects or across objects of like type. However, with the data collection information built into the agents, it may be difficult for a user to change the frequency or type of data collected by the agents. Accordingly, it is desirable to provide a mechanism for modifying the data collection of the agents by a user of the EMC software.

SUMMARY OF THE INVENTION

According to the present invention, collecting data for a storage area network includes providing a plurality of agents that collect data from objects of the storage area network, providing a plurality of data collection policies, where each of the policies indicates a type of data to be collected and a frequency of collection, and applying the policies to the agents, where the agents collect data according to the type of data and the frequencies indicated by the data collection policies. At least one of the agents may have a plurality of data collection policies applied thereto to cause the at least one agent to collect the types of data at the frequencies indicated by the merge of all of the data collection policies applied to the at least one agent. Merging the data collection policies may be performed by the at least one of the agents that receives the data collection policies. Merging the data collection policies may be performed by an entity other than the at least one of the agents. Collecting data for a storage area network may include displaying to a user at least one of the data collection policies for at least one of the agents. Collecting data for a storage area network may include allowing the user to modify the at least one data collection policy for the at least one of the agents. Collecting data for a storage area network may include, in response to a user modifying the at least one data collection policy, providing the at least one data collection policy to the at least one agent. Allowing a user to modify the at least one data collection policy may include allowing a user to delete the at least one data collection policy. Collecting data for a storage area network may include, in response to a user modifying the at least one data collection policy, providing to the at least one agent all of the data collection policies for the at least one agent. Allowing the user to modify the at least one data collection policy may include allowing the user to select one or more of the agents to which the at least one data collection policy is to be applied. The user may be restricted to applying the at least one data collection policy to only agents of an appropriate type. Allowing the user to modify the at least one data collection policy may include having the user modify a template for the at least one data collection policy. Applying the policies to the agents may override any of the agents' built-in data collection policies. Each of the data collection policies may be applied to a single agent, a group of agents, or agents that service a particular type of object of the storage area network. Collecting data for a storage area network may include at least one of the agents maintaining a local copy of the data collection policies applied thereto.

According further to the present invention, computer software that collects data for a storage area network includes a plurality of executable code software agents that collect data from objects of the storage area network, executable code that manages a plurality of data collection policies, where each of the policies indicates a type of data to be collected and a frequency of collection, and executable code that applies the policies to the agents, where the agents collect data according to the type of data and the frequencies indicated by the data collection policies. At least one of the agents may have a plurality of data collection policies applied thereto to cause the at least one agent to collect the types of data at the frequencies indicated by the merge of all of the data collection policies applied to the at least one agent. At least one of the agents may include executable code to merge the data collection policies applied thereto. Computer software that collects data for a storage area network may also include executable code to display to a user at least one of the data collection policies for at least one of the agents. Computer software that collects data for a storage area network may also include executable code to allow the user to modify the at least one data collection policy for the at least one of the agents. Computer software that collects data for a storage area network may also include executable code that provides the at least one data collection policy to the at least one agent in response to a user modifying the at least one data collection policy. Computer software that collects data for a storage area network may also include executable code that allows a user to delete the at least one data collection policy. Computer software that collects data for a storage area network may also include executable code that provides to the at least one agent all of the data collection policies for the at least one agent in response to a user modifying the at least one data collection policy. Computer software that collects data for a storage area network may also include executable code that allows the user to select one or more of the agents to which the at least one data collection policy is to be applied. Computer software that collects data for a storage area network may also include executable code that restricts the user to applying the at least one data collection policy to only agents of an appropriate type. Computer software that collects data for a storage area network may also include executable code that facilitates the user modify a template for the at least one data collection policy. The agents may include executable code that overrides any of the agents' built-in data collection policies. Computer software that collects data for a storage area network may also include executable code for applying each of the data collection policies to a single agent, a group of agents, or agents that service a particular type of object of the storage area network.

DETAILED DESCRIPTION OF VARIOUS EMBODIMENTS

Figure 1:
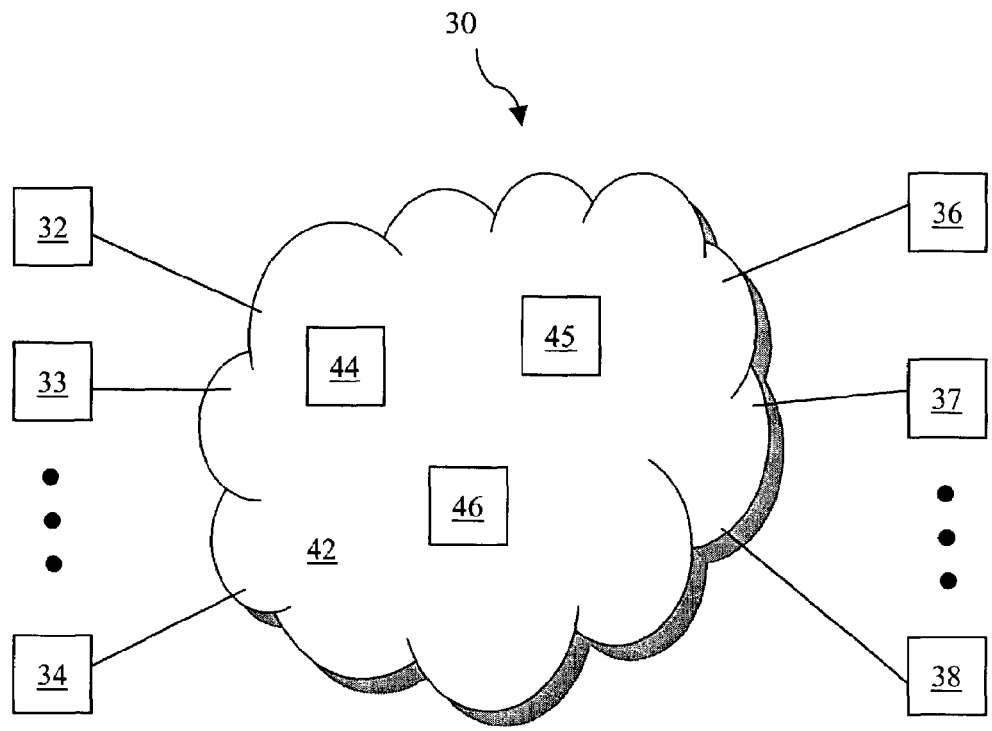
FIG. 1 is a diagram illustrating a storage area network (SAN) that contains a plurality of hosts, a plurality of storage devices, and a plurality of switches according to the system described herein.

Referring to FIG. 1, storage area network (SAN) 30 includes a plurality of hosts 32-34, coupled to a plurality of storage devices 36-38 via a SAN fabric 42. The SAN fabric 42 may include a plurality of switches 44-46 that switch data between the hosts 32-34 and the storage devices 36-38. The SAN fabric 42 may connect one or more of the hosts 32-34 to one or more of the storage devices 36-38 via one or more of the switches 44-46. A system for monitoring and configuring a SAN 30 is disclosed, for example, in U.S. patent application Ser. No. 09/431,758 filed on Nov. 1, 1999, which is incorporated by reference herein. The following discussion relates to that type of system that may be used in conjunction with, or as a supplement to, the system disclosed in U.S. patent application Ser. No. 09/431,758.

It is possible to have a program running on one or more of the hosts 32-34 to monitor operation of one or more objects that are components of the SAN 30, such as the hosts 32-34, the storage devices 36-38, and/or the switches 44-46. The program includes subprograms/tasks called "agents", which run independently to monitor information on an object (e.g., one of the storage devices 36-38, one of the switches 44-46, one of the hosts 32-34, etc.) and transfer data about the objects as well as receive data indicating what should be monitored and how often. Each agent is written specifically for the type of object it monitors and the data it collects. However, as explained in detail elsewhere herein, it is possible to generically specify the data collection policies (object/frequency/type of data) for the agents. In some cases, the agents may have been provided with built in data collection policies which may be either overridden or "merged" (described below) with the generically specified and dynamic data collection policies described herein.

Figure 2:
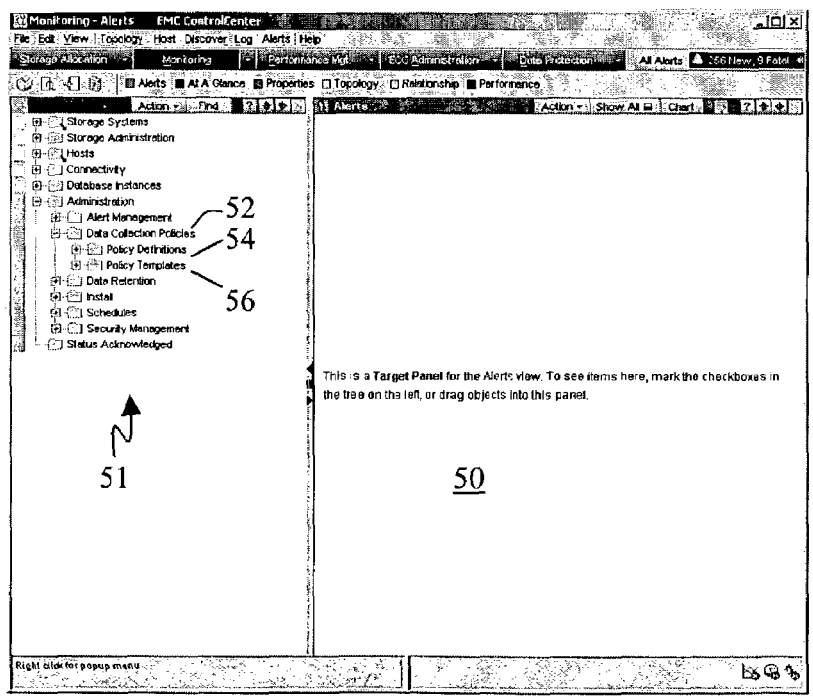
FIG. 2 is a screen display showing an aspect of using a program to monitor and control a SAN according to the system described herein.

Referring to FIG. 2 the program to monitor and control the SAN 30 provides a screen 50 to a user of the program. The screen 50 includes a folder tree 51 that has a plurality of folders and related items that facilitate monitoring and controlling the SAN 30. One of the folders 52 relates to data collection policies. Inside the folder 52 is a subfolder for policy definitions 54 and a subfolder for policy templates 56. The data collection policy definitions represented by the folder 54 relates to the actual data collection policies for each of the agents used on the system. As explained in more detail elsewhere herein, it is possible to modify the actual data collection policy for one or more individual agents, one or more groups of agents, and/or one or more types of agents or types of objects monitored by the agents. For example, it may be possible to modify the data collection policy definitions applied to all storage devices in the system. As explained in more detail elsewhere herein, such a modification would affect agents that perform data collection on storage devices. Similarly, it is possible to have groups of agents, such as a group of agents relating to a particular type of storage device (e.g., Symmetrix storage devices provided by EMC Corporation of Hopkinton, Mass.). In such a case, it may be possible to modify the data collection policies of only those agents that belong to the group, in which case a modification would affect all agents corresponding to the group. Agents may belong to more than one group. It is also possible to modify the data collection policy of a specific agent.

Note further that it is possible for an agent to have more than one data collection policy applied thereto. In that case, all of the data collection policies for a particular agent are merged (OR'ed) to cause the agent to collect data according to all of the policies which apply. Thus, for example, if an agent is subject to a first policy that causes data collection on Monday, Wednesday, and Friday, and a second policy that causes data collection on Tuesday, Thursday, Saturday, and Sunday, that agent will collect data every day of the week according to one policy or the other. In some embodiments, it is possible to display a list of agents and right click on each agent to show that applicable data collection policies. The merging may be performed by the agents or by an other entity, such as the entity that provides data collection policy information to the agents.

The data collection policy templates folder 56 represents generic templates for different types of objects. Thus, unlike the data collection policy definitions folder 54, which contains actual policy definitions for agents in the system, the data collection policy templates folder 56 corresponds to data collection policy templates which are not applied to any specific agents but which may be used in connection with creating and/or editing data collection policy definitions for agents.

Figure 3:
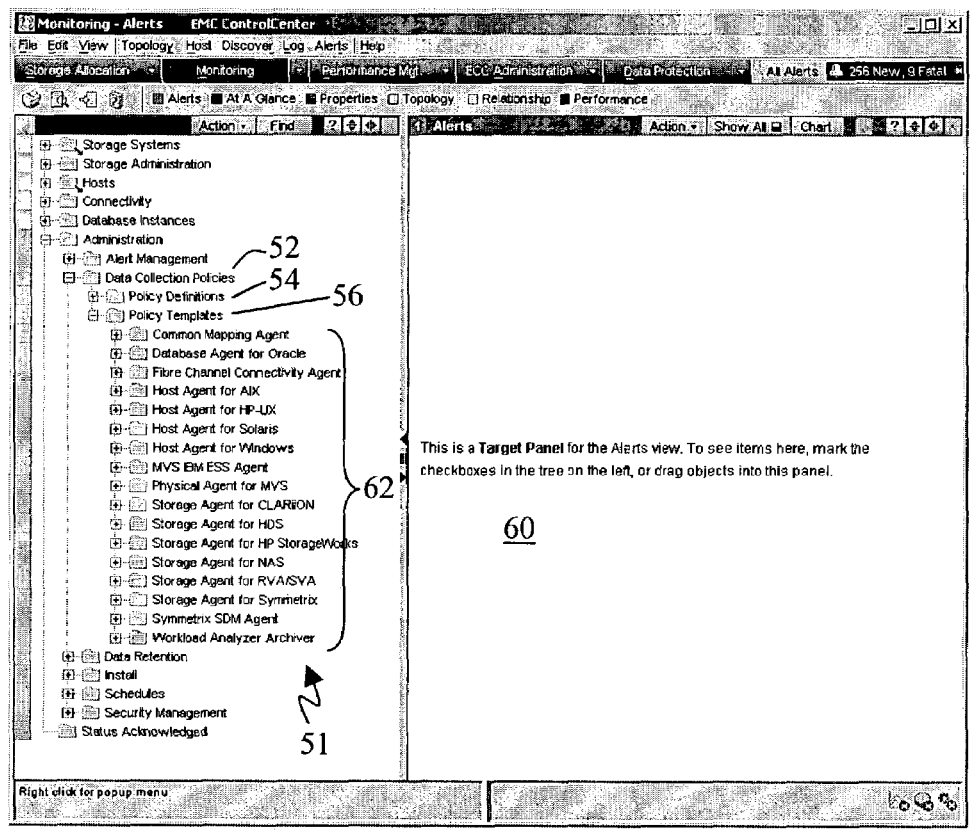
FIG. 3 shows an expanded menu for a screen display for a program to monitor and control a SAN according to the system described herein.

Referring to FIG. 3, a screen 60 illustrates expansion of the data collection policy templates folder 56 to show a plurality of items 62 that correspond to specific types of templates. As explained in more detail elsewhere herein, each of the items 62 may be further expanded to show specific templates. In some embodiments, expansion/selection of items may be provided by right clicking the mouse.

Figure 4:
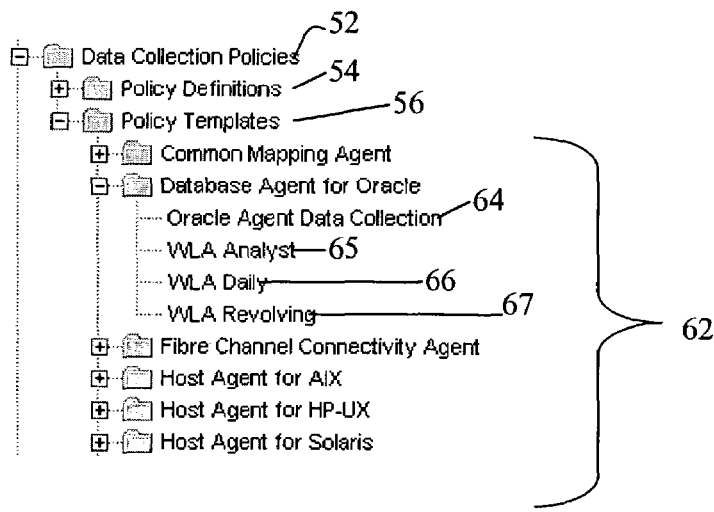
FIG. 4 shows a further expanded portion of the menu of FIG. 3 according to the system described herein.

Referring to FIG. 4, one of the items 62 corresponding to the database agents for Oracle is shown as expanded into four separate items 64-67. Each of the items 64-67 corresponds to a particular type of template that may be used to monitor a database for Oracle. A user may select one of the particular types corresponding to the items 64-67 to perform editing and/or to create an instance of a data collection policy for an Oracle agent.

Figure 5:
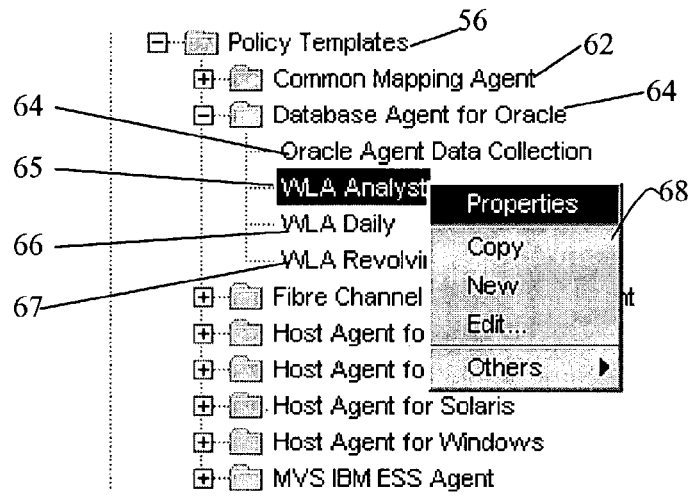
FIG. 5 shows a pull down menu used in connection with selecting an item according to the system described herein.

Referring to FIG. 5, a pull down menu 68 is provided when a user selects the item 65 that is contained in the database agents for oracle folder 62. The menu 68 includes selections for properties, copy, new, edit, and others. Selecting the properties from the menu 68 allows a user to view the properties of the data collection policy template. Selecting copy from the menu 68 allows the user to copy the template. Selecting new from the menu 68 allows the user to create a new instance of the template. Selecting edit from the menu 68 allows the user to edit the template. The result of selecting different menu options is discussed in more detail elsewhere herein.

Figure 6:
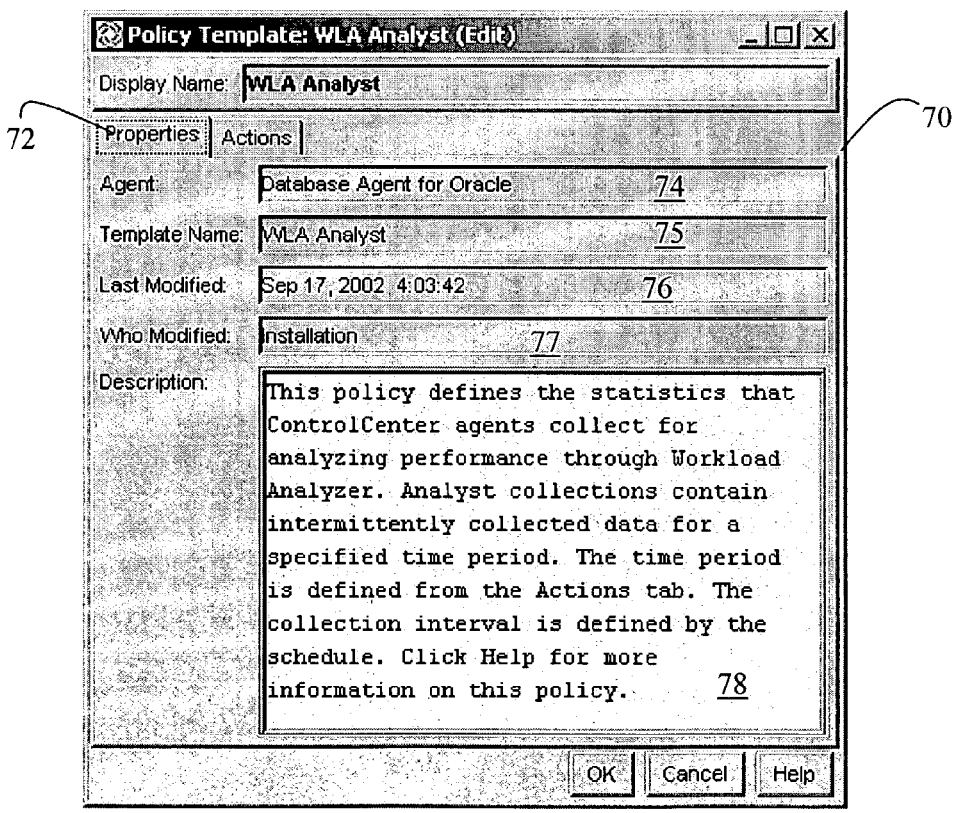
FIG. 6 shows a dialog box for editing properties of a data collection policy template for an agent according to the system described herein.

Referring to FIG. 6, a dialog box 70 is provided in connection with the user selecting edit from the menu 68 of FIG. 5. The dialog box includes a properties tab 72, which is shown in FIG. 6 as being the selected tab. The information in the dialog box 70 includes an agent identification field 74, a template name field 75, a last modified field 76, and a who modified field 77. The dialog box 70 may also include a description 78 that could aide a user in connection with using the data collection policy template.

Figure 7:
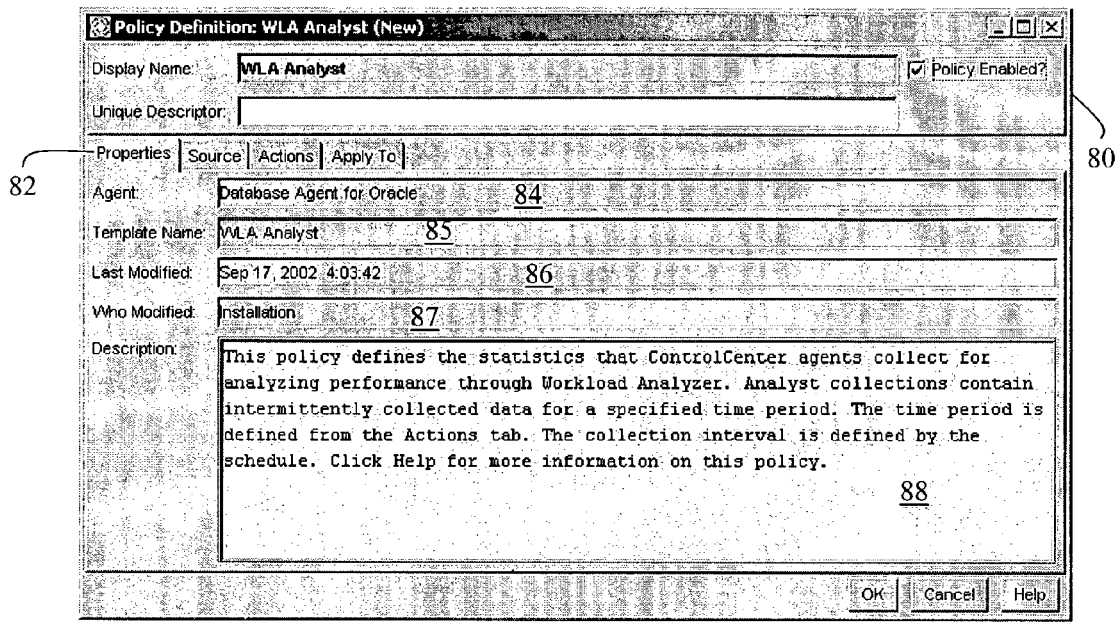
FIG. 7 shows a dialog box for creating a new data collection policy instance for an agent according to the system described herein.

Referring to FIG. 7, a dialog box 80 is provided in connection with a user selecting the new item from the menu 68 of FIG. 5. The dialog box 80 includes a properties tab 82 (which is selected), an agent field 84, a template name field 85, a last modified field 86, and a who modified field 87. The dialog box 80 also contains a description field 88. Note that the dialog box 80 is similar to the dialog box 70 of FIG. 6. However, the dialog box 80 allows a user to create a new data collection policy instance to be applied to an agent in a manner described elsewhere herein. In contrast, the dialog box 70 simply allows a user to edit an existing data collection policy template.

Figure 8:
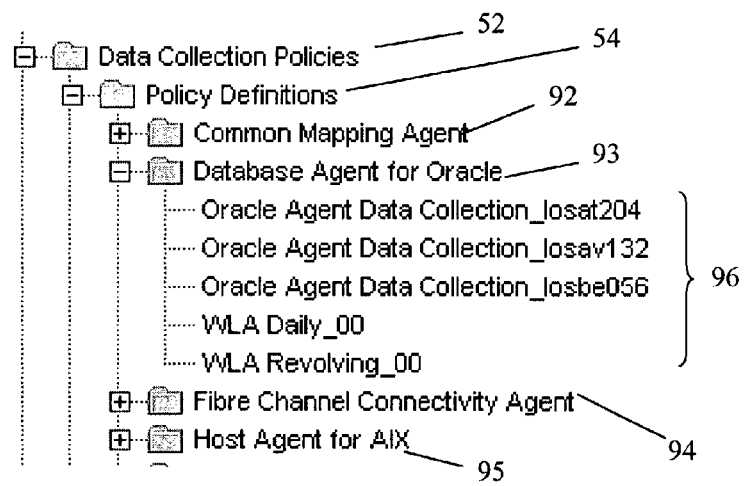
FIG. 8 shows a further expanded portion of the menu of FIG. 3 according to the system described herein

Referring to FIG. 8, a portion of FIG. 3 is shown where an item corresponding to the specific data collection policy 52 is expanded. Unlike the data collection templates, which do not apply to any specific agents, each of the items in the data collection policies folder 54 corresponds to a specific policy for one or more specific agents. The data collection policies folder 54 contains a plurality of subfolders 92-95 which correspond to different groups of agents. Each of the subfolders 92-95 contains items corresponding to specific agents for objects of the storage area network being monitored and controlled. Thus, for example, the subfolder 93 may be expanded to show a plurality of items 96, each of which corresponds to a data collection policy for a specific agent.

Figure 9:
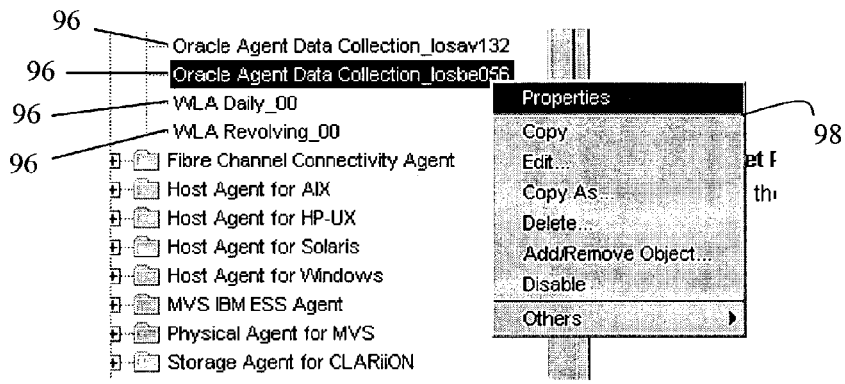
FIG. 9 shows a pull down menu used in connection with selecting an item according to the system described herein.

Referring to FIG. 9, a menu 98 is provided when a user selects one of the items 96. The menu 98 includes a properties, copy, and edit choices similar to the menu 68 of FIG. 5, discussed above. A "copy as" selection allows a user to copy the specific data collection policy but change the name. In contrast, the "copy" selection automatically changes the name only slightly. The delete option allows deletion of the data collection policy. The add/remove object, described below, allows for the addition or removal of objects. Selecting disable from the menu 98 prevents the policy from operating on the agent.

Figure 10:
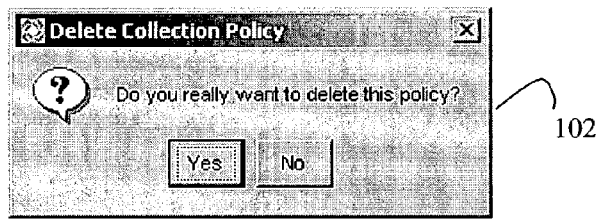
FIG. 10 shows a dialog box for determining if a user intends to delete a particular data collection policy according to the system described herein.

Referring to FIG. 10, a dialog box 102 illustrates what is provided in connection with the user selecting delete from the menu 98 of FIG. 9. The dialog box 102 allows a user to confirm deletion of the data collection policy. As described elsewhere herein, once a data collection policy is deleted, agents that use the policy will be informed and will no longer collect data according to the policy.

Figure 11:
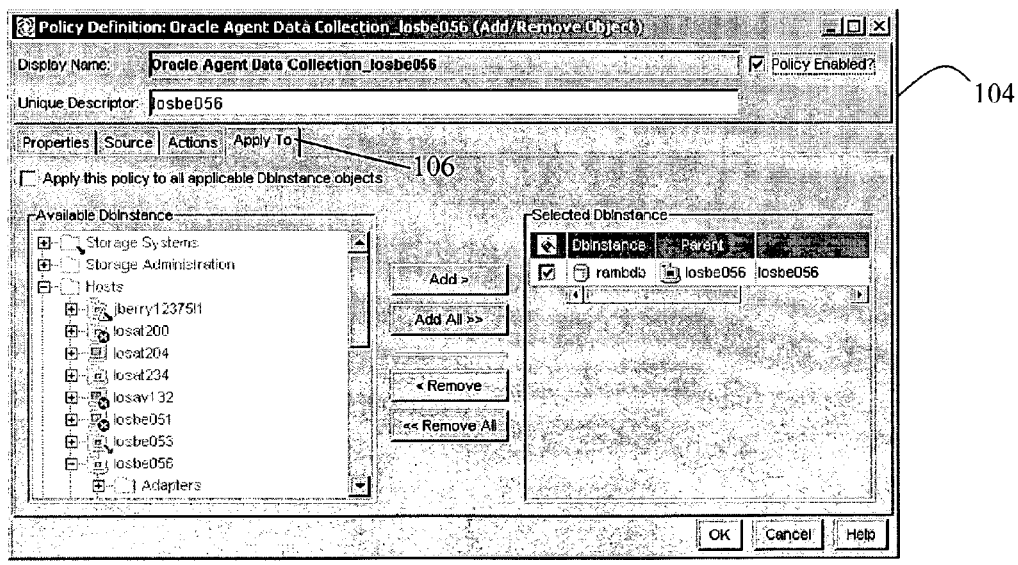
FIG. 11 shows a dialog box for applying a data collection policy to one or more particular agents according to the system described herein.

Referring to FIG. 11, a dialog box 104 is provided in connection with a user selecting add/remove object from the menu 98 of FIG. 9. Note that the dialog box 104 may also be provided in connection with the user selecting an Apply To tab 106 in the dialog box 80 of FIG. 7. Thus, the dialog box 104 may be reached either by the user selecting add/remove object from the menu 98 or by the user selecting the apply to tab in the dialog box 80.

The dialog box 104 allows a user to apply the specific data collection policy to one or more specific agents, one or more specific groups of agents/objects, and/or one or more specific types of agents/objects. The follow on processing that is performed once the data collection policies for one or more agents have been modified is described in more detail elsewhere herein.

Figure 12:
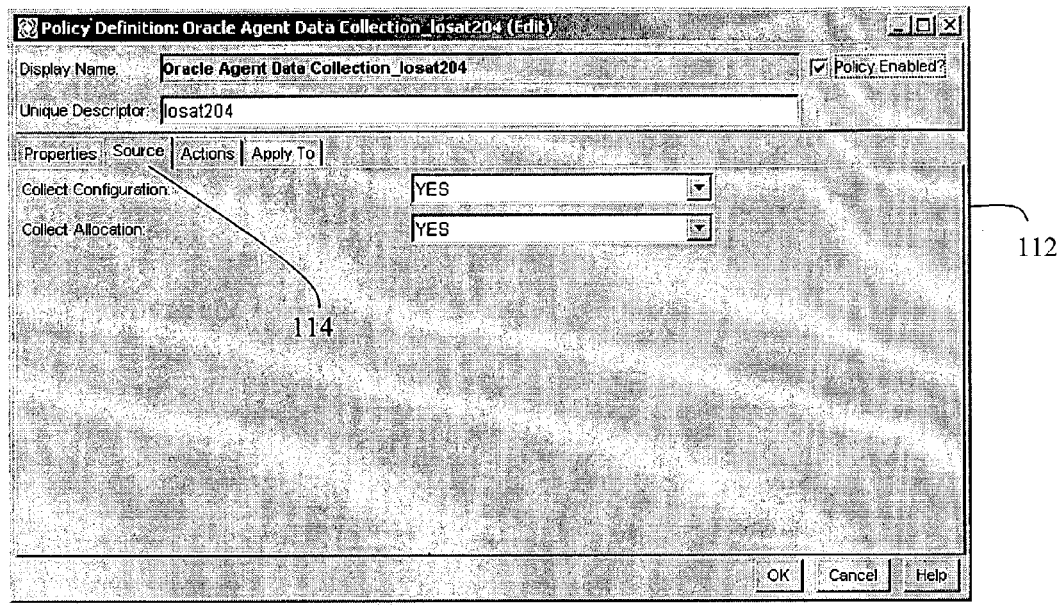
FIG. 12 shows a dialog box for choosing a source of data collected for a data collection policy according to the system described herein.

Referring to FIG. 12, a dialog box 112 is provided in connection with a user selecting a Source tab 114 in a policy definitions dialog box like the dialog box 80 of FIG. 7 and the dialog box 104 of FIG. 11. The dialog box 112 allows a user to select a source of data (i.e., the type of data that is collected). For each different type of agent and data collection policy, the dialog box 112 will be different because the type of data that may be collected and/or may be desirable to collect may be different for different types of agents and different types of objects.

Figure 13:
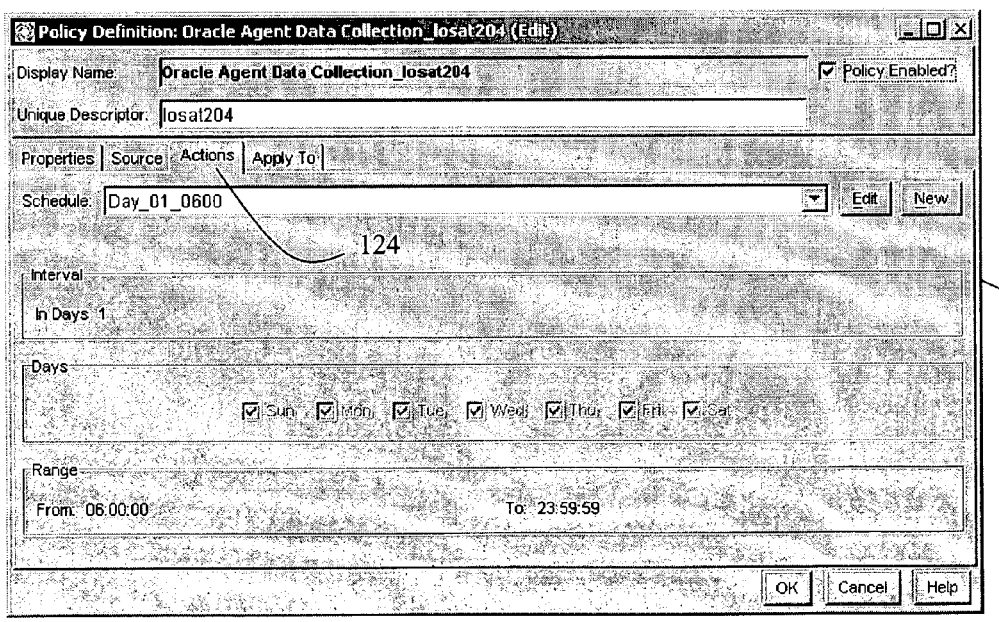
FIG. 13 shows a dialog box for choosing frequency of collection actions that may be selected for data collection policy according to the system described herein.

Referring to FIG. 13, a dialog box 122 is provided in connection with selecting the Actions tab 124 of a dialog box like the dialog box 112 of FIG. 12, the dialog box 104 of FIG. 11, and the dialog box 80 of FIG. 7. The dialog box 122 allows a user to select the frequency of data collection for the particular data collection policy. The different options on the dialog box 122 allow collection of data at different intervals.

Figure 14:
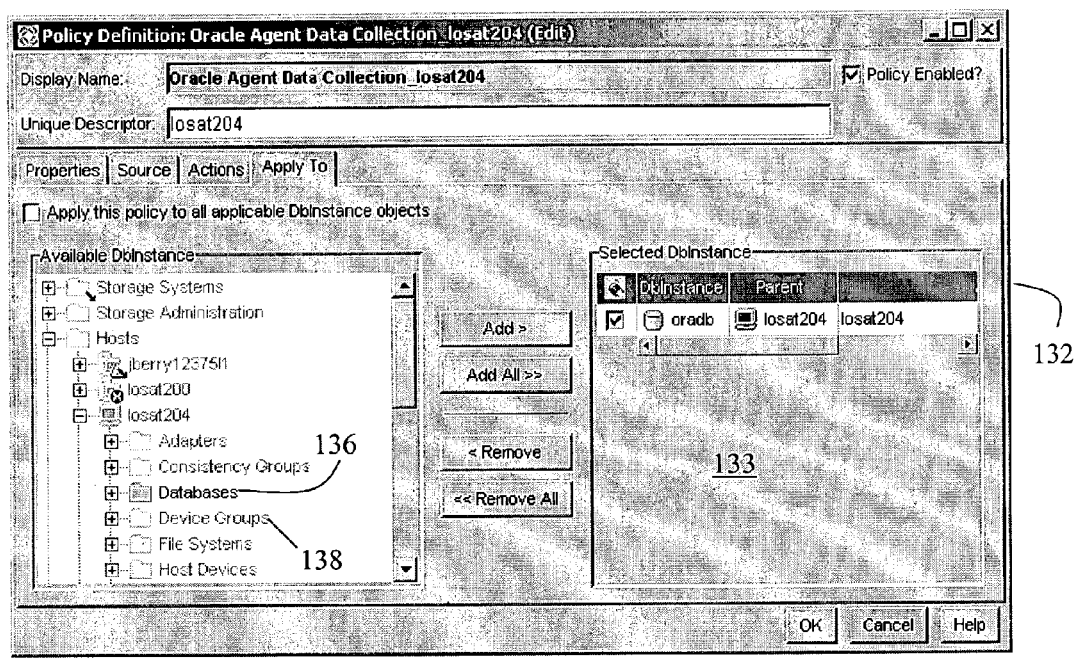
FIG. 14 shows a dialog box for applying a data collection policy to one or more particular agents according to the system described herein.

Referring to FIG. 14, a dialog box 132 is provided in connection with selecting an Apply To tab 134 on a dialog box like the dialog box 122 of FIG. 13, the dialog box 112 of FIG. 12, and the dialog box 80 of FIG. 7. The dialog box 132 allows a user to select an agent, group of agents/objects, and/or type of agent/object to apply the particular data collection policy. A field 133 of the dialog box 132 indicates the possible choices to which the data collection policy may be applied. Note that the choices for applying the data collection policy are limited to the type of agent that corresponds to the data collection policy. Thus, in the example of FIG. 14, only the databases item 136 is selectable in the window on the left hand side while all of the other items, such as the device groups item 138, are not selectable. This prevents a user from applying a data collection policy to an inappropriate agent.

Use of generic data collection policies across different types of agents as described herein allows for centralized management of data collection policies for the agents. The data collection policies also allow standardization of data collection across different objects of a storage area network.

Figure 15:
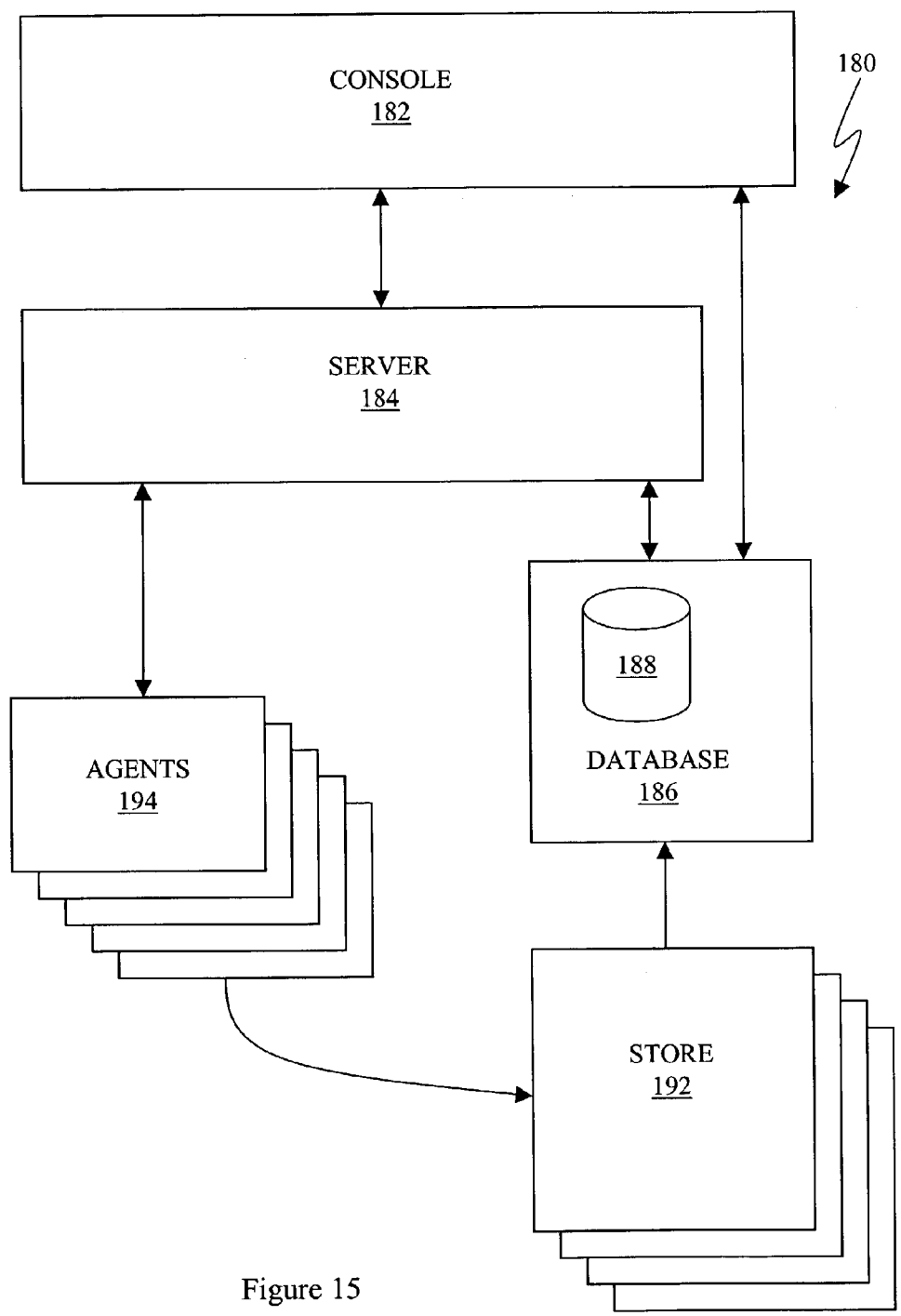
FIG. 15 is a block diagram illustrating a relationship between portions of a program used to monitor and control operation of a SAN according to the system described herein.

Referring to FIG. 15, a diagram 180 illustrates a structure of a program to monitor and control objects associated with a storage area network. The program includes a console module 182, a server module 184, and a database module 186 that contains a data collection policy data element 188. The program also includes a plurality of store modules 192 and a plurality of agents 194. Each of the modules 182, 184, 186, 192, 194 may or may not reside on the same or different objects associated with the storage area network. The console 182, the server 184, the database 186, and the store modules 192 may reside on one or more hosts. Each of the agents 194 may reside on the particular object for which the agent is responsible or, in some instances, may reside on an object where the agent has appropriate access to the data being collected for the object. For example, an agent collecting data related to a particular storage device may reside on a host coupled to that storage device provided that the agent is able to obtain the information that it needs about the storage device from the host.

The interconnections between the modules 182, 184, 186, 192, 194 illustrate data paths therebetween. Thus, for example, there is a two-way data path between the console 182 and the server 184. As described elsewhere herein, in some instances it may not be necessary for a data path to be persistent, provided that the data path is available when data needs to be communicated. In some instances, data needs to be communicated at certain times and not at others.

The console 182 represents the portion of the program that interacts with a user. Thus, the console 182 provides the screens and menus to the user described herein. The console 182 also receives input from the user who makes selections and/or edits as described elsewhere herein. Thus the console 182 is, in effect, the user interface for the remainder of the program. The console 182 may be implemented using Java and standard system calls to provide the user interface.

The database 186 includes the data collection policy data element 188 that represents the data collection policies and the data collection templates that apply to all of the agents 194. In other embodiments, the data collection policy data element 188 may be stored separate or partially separate from the database 186. The data collection policy data element 188 may also be distributed among more than one host and/or other device.

When a user edits a data collection policy or a data collection policy template, the specific data for the policy/template being modified is provided by the database 186 from the data collection policy data element 188 to the console 182 through the server 184. In other embodiments, data from the data collection policy data element 188 may be provided directly from the database 186 to the console 182 without first passing through the server 184. The direct communication may be used to enhance performance. Note that the database 186, the server 184, and the console 182 may be on different hosts or may be on the same host, or some combination thereof. In any event, when a user edits the data for a data collection policy or a data collection policy template, the initial data presented to the user by the console 182 is provided from the data collection policy data element 188.

After the data has been modified by the user, the console 182 provides the data to the server 184 which pushes the data back to the database 186 for storage in the data collection policy data element 188. The server also determines which, if any, of the agents 194 need to receive the new data collection policy. Note that, in some instances, a user's edits may only relate to data collection policy templates, in which case the server 184 may simply provide the data back to the database 186 for writing to the data collection policy data element 188. However, in instances where modifications by a user require propagation to the agents 194, the server 184 determines which agents require the new data and will provide the new data collection policy to the agents 194. Thereafter, each of the agents 194 collect data and provide the data to one of the store modules 192 which then may store the data to the database 186.

In some embodiments, one or more of the agents 194 may maintain a local copy of its data collection policy. Thus, in some instances, the agents 194 may continue to collect data without requiring a persistent connection between the server 184 and the agents 194. In some embodiments, the agents 194 poll the server 184 prior to each collection of data. The server 184 indicates to the agents 194 the identity of a particular one of the store modules 192 to which the data should be provided by the agents 194. The server 184 may select the particular one of the store modules 192 based on a variety of functional factors obvious to one skilled in the art, such as load balancing. The particular one of the store modules 192 may then transfer the collected data to the database 186. In some embodiments, there may be only one store module which may be used to receive data from the agents 194.

Figure 16:
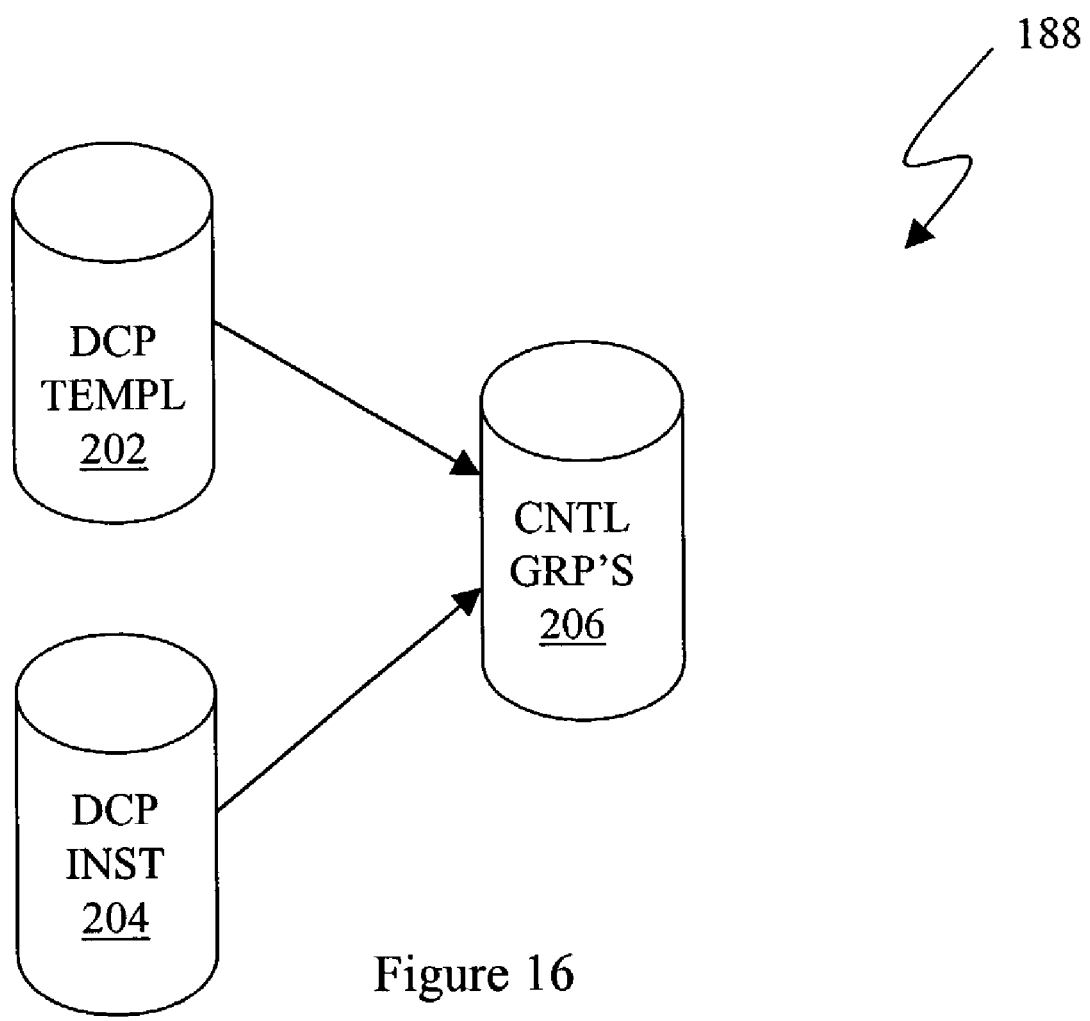
FIG. 16 is a diagram showing a relationship between data used in connection with data collection policies according to the system described herein.

Referring to FIG. 16, the data collection policy data element 188 includes a data collection policy templates 202, data collection policy instances 204, and control groups 206. The control groups 206 contain information regarding the frequency of data collection. Each of the data collection policy templates 202 and data collection policy instances 204 may contain a pointer to an entry in the control groups 206 to indicate the frequency of data collection. The information in the data collection policy templates 202 and data collection policy instances 204 corresponds to the other data collection policy information discussed elsewhere herein.

The data may be stored in any appropriate fashion, including conventional tables. The data collection policy tables may contain a name field, a list of possible sources of data (see on the Source tab, described above), help information (used if the user selects help), and information indicating the type of object/agent to which the data collection policy applies. The tables may also include a field indicating whether the type of data collection policy is uniquely assigned to an agent (preventing other data collection policies of the same type being assigned to the same agent), a field indicating whether the data collection policy is enabled or disabled, a description of the data collection policy (described above), a pointer to the appropriate control group for, the data collection policy, an indicator of whether the data collection policy is assigned to all types of objects to which it applies, a field indicating the date of last modification of the data collection policy, and a field indicating the user that made the last modification.

Figure 17A:
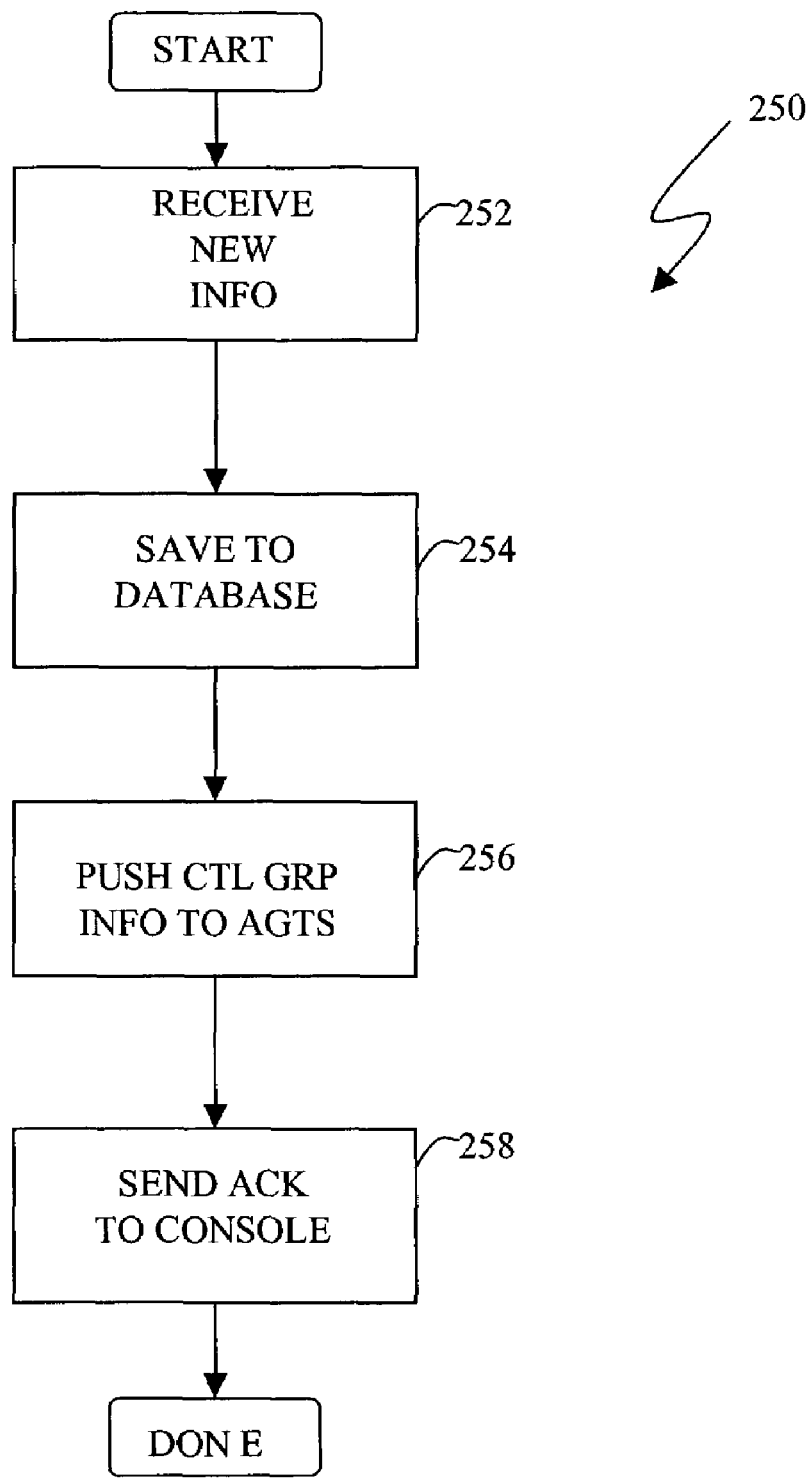
FIGS. 17A and 17B are a flow charts illustrating operation of a server portion of a program used to monitor and control operation of a SAN according to the system described herein.

Referring to FIG. 17A, a flow chart 250 illustrates steps performed by the server 184 after a user defines a new control group or changes an existing control group definition. Processing begins at a first step 252, where the server 184 receives the new information from the console 182. As discussed elsewhere herein, the console 182 provides a user interface to display and receive data, including data about data collection policies. The console 182 and the server 184 may reside on the same host or on different hosts. The communication between the console 182 and the server 184 may be by any appropriate means suitable to provide the functionality described herein.

Following the step 252 is a step 254 where the new information received at the step 252 is passed to the database 186 for storing in the data collection policy data element 188. As discussed elsewhere herein, the database 186 and the server 184 may be provided on the same host or on different hosts. In addition, just as with the console 182 and the server 184, the communication between the database 186 and the server 184 may be by any appropriate means suitable to provide the functionality described herein. The data passed from the server 184 to the database 186 is stored in the data collection policy data element 188 for follow on processing as described elsewhere herein.

Following the step 254 is a step 256 where the server 184 pushes new control group information to the affected ones of the agents 194. Following the step 256 is a step 258 where the server 184 acknowledges to the console 182 that the server 184 has completed processing the user edits passed from the console 182 to the server 184 at the step 252. The step 258 may be eliminated or may be optional in some embodiments.

Figure 17B:
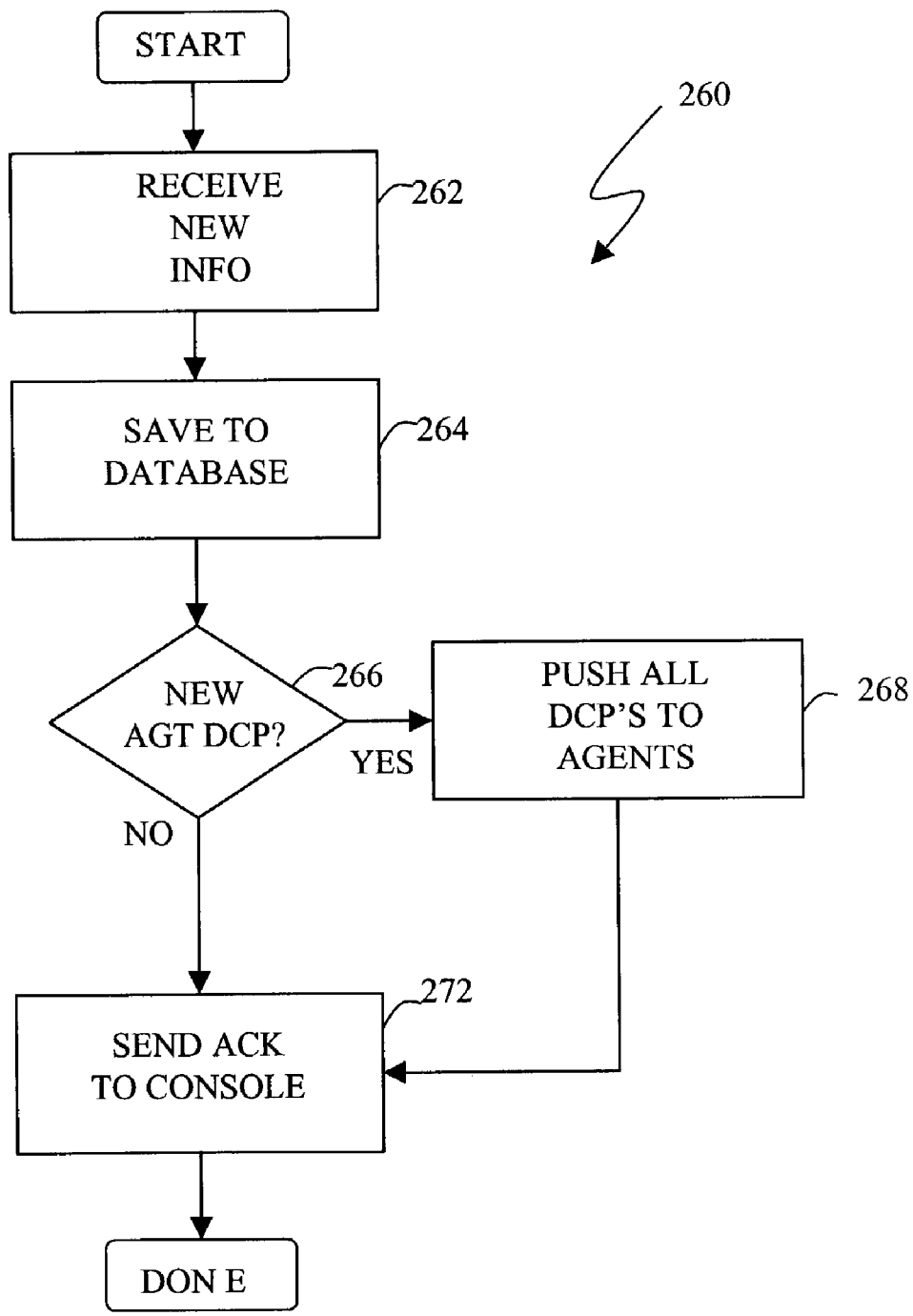

Referring to FIG. 17B, a flow chart 260 illustrates steps performed by the server 184 after a user changes a data collection policy for one or more agents. Processing begins at a first step 262, where the server 184 receives the new information from the console 182. As discussed elsewhere herein, the console 182 provides a user interface to display and receive data, including data about data collection policies. The console 182 and the server 184 may reside on the same host or on different hosts. The communication between the console 182 and the server 184 may be by any appropriate means suitable to provide the functionality described herein.

Following the step 262 is a step 264 where the new information received at the step 262 is passed to the database 186 for storing in the data collection policy data element 188. As discussed elsewhere herein, the database 186 and the server 184 may be provided on the same host or on different hosts. In addition, just as with the console 182 and the server 184, the communication between the database 186 and the server 184 may be by any appropriate means suitable to provide the functionality described herein. The data passed from the server 184 to the database 186 is stored in the data collection policy data element 188 for follow on processing as described elsewhere herein.

Following the step 264 is a test step 266, where it is determined if any of the passed information affects any of the agents 194. As discussed elsewhere herein, user edits may or may not affect actual data collection policies of one or more of the agents 194. If it is determined at the step 266 that one or more of the agents 194 has been affected, then control passes from the step 266 to a step 268, where the new data collection policy information is pushed from the server 184 to the affected ones of the agents 194. Note that at the step 268, it is possible to provide each affected agent with all of the agent's data collection policies, including policies that have not changed. Thus, for example, if a particular agent has ten applicable data collection policies (which are merged, as described elsewhere herein), the server 184 could send all ten to the particular agent, even though not all have been changed by user edits. Note also that, in some embodiments, the server 184 could first merge the applicable data collection policies and then send the results of the merge to the agents.

A step 272 follows the step 266 or the step 268. At the step 268, the server 184 acknowledges to the console 182 that the server 184 has completed processing the user edits passed from the console 182 to the server 184 at the step 262. The step 272 may be eliminated or be optional in some embodiments.

In some cases, a user may want to initiate or adjust monitoring a particular object in the SAN 30, but may not know which agents are responsible for the particular object. In those cases, it would be useful to have a mechanism that allows a user to specify a particular object (or group of objects or type of object) rather than having to know the identity of an agent. In addition, in some cases it is possible for an agent to stop working for any number of reasons. When this happens, it would be useful to have an automatic mechanism for providing a different agent to take over the data collection of the failed agent.

Figure 18:
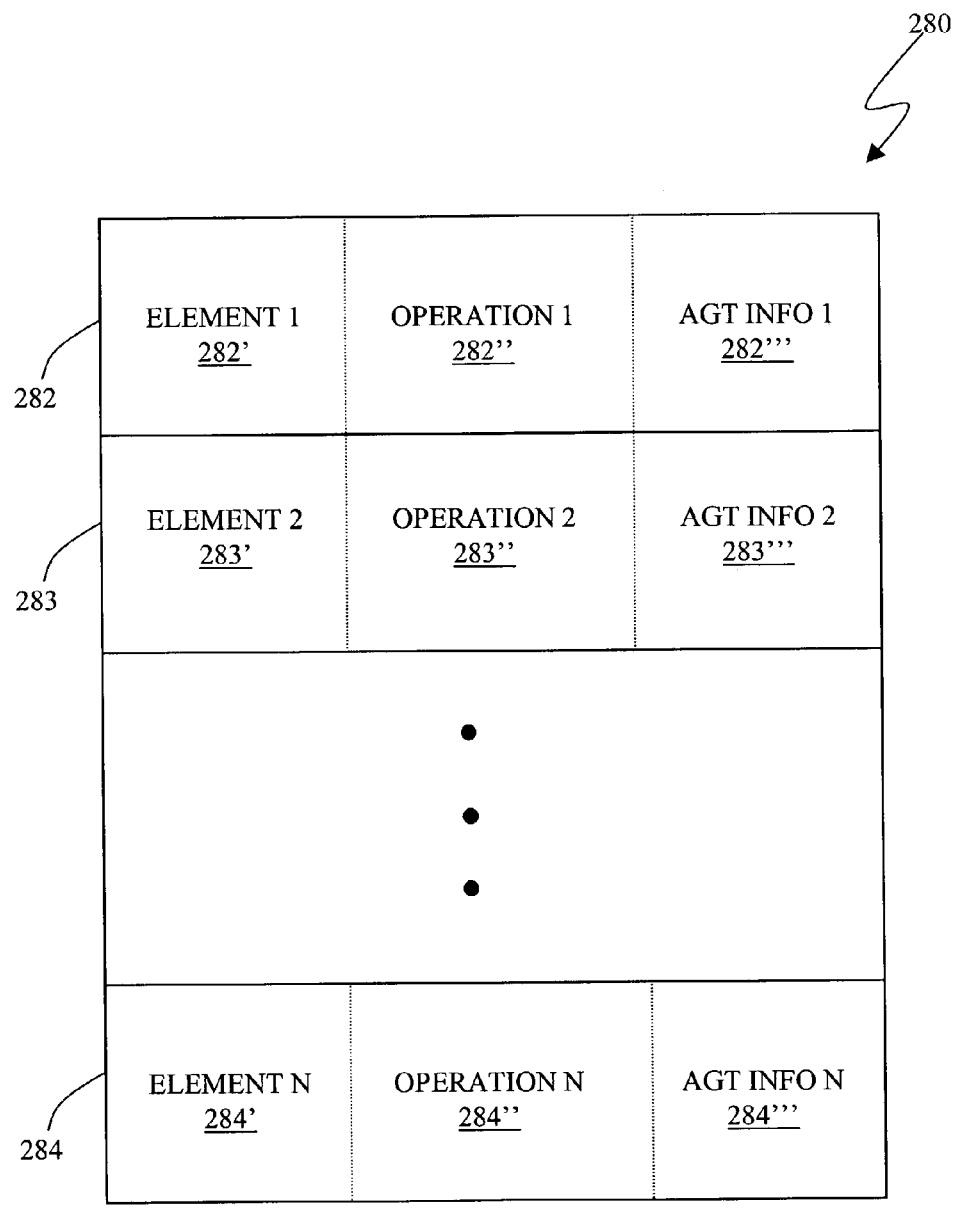
FIG. 18 is a diagram illustrating a table used to store information for agents that monitor objects in a program used to monitor and control operation of a SAN according to the system described herein.

Referring to FIG. 18, a table 280 includes a plurality of entries 282-284, each of which corresponds to an element of the SAN 30. The table 280 may be part of the data collection policy data element 188, discussed above. The table 280 may be accessed and/or modified by the server 184 through the database 186. In other embodiments, the table 280 may be stored separate from the data collection policy data element 188 and may also be separate or partially separate from the database 186. The table 280 may also be distributed among more than one host and/or other device.

The table 280 includes a plurality of elements 282-284, each of which may represent, for example, an object or specific data to be monitored. Each of the elements 282-284 has three fields. The first field corresponds to an element identifier 282'-284'. The second field corresponds to an operation identifier 282"-284". The third field corresponds to an agent information field 282'''-284'''. The element identifier fields 282'-284' identify each of the elements. For example, an element may be identified as a particular storage device. The operation identifiers 282"-284" represent operations that may be performed for each of the corresponding elements. For example, if the element identifier 282' corresponds to a particular storage device, then the operation 282" could, for example, correspond to monitoring a particular statistic for the particular storage device. The agent information fields 282'''-284''' indicates a specific agent for providing the corresponding operation to the corresponding element. The agent information fields 282'''-284''' also include an indication of whether the agent is a primary or secondary (described below) and the cost of using the agent (described below).

Using the table 280, a user could specify a particular object (and a particular statistic of the object) to be monitored. The server 184 could then use the table 280 to find an appropriate entry having a matching element and operation. The agent indicated by the agent info field of that entry would be the agent used to monitor the object specified by the user.

Figure 19:
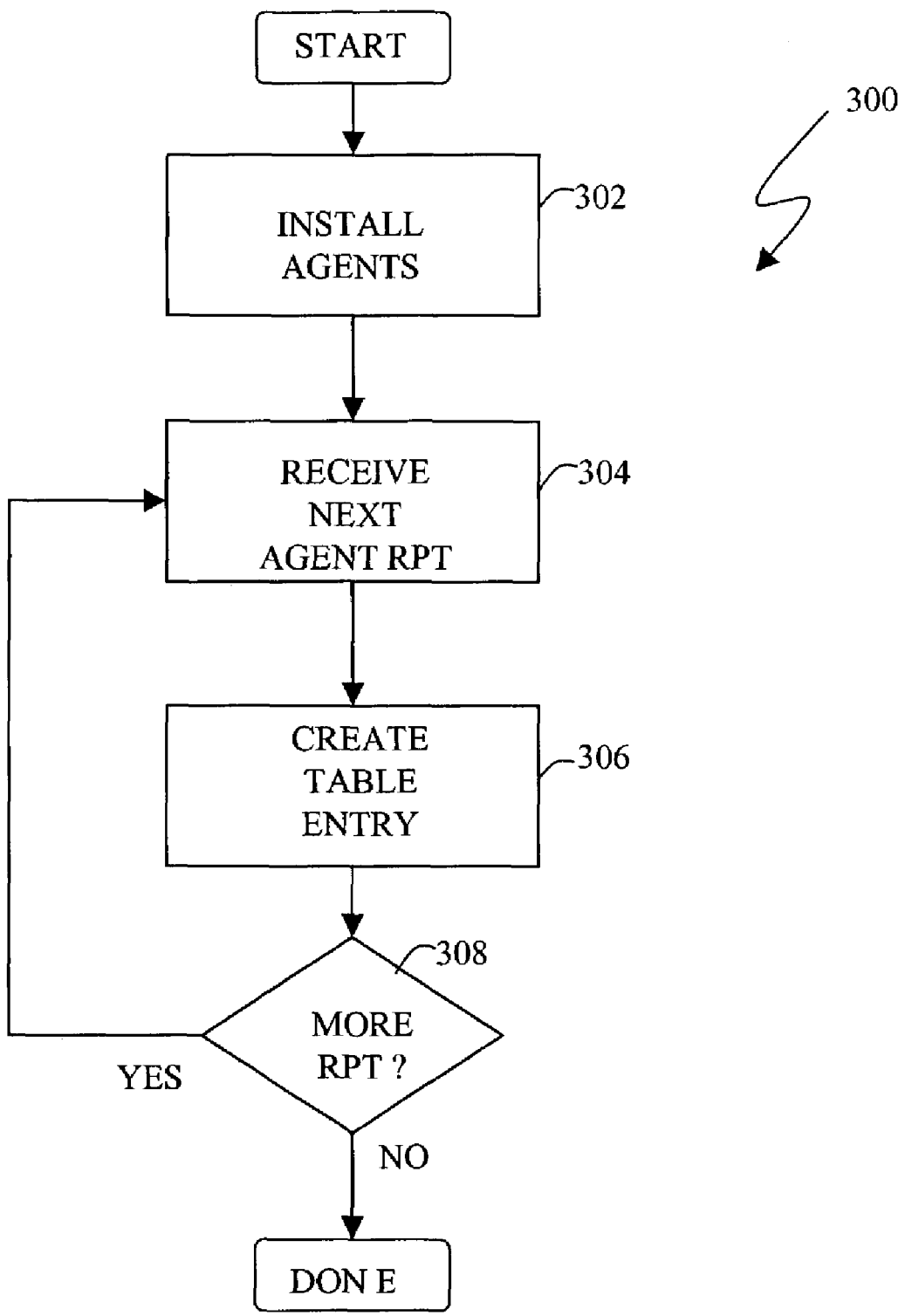
FIG. 19 is a flow chart illustrating a portion of initialization of a program used to monitor and control operation of a SAN according to the system described herein.

Referring to FIG. 19, a flow chart 300 illustrates steps performed in connection initializing the table 280 of FIG. 18. The steps of the flow chart 300 may be performed when the system is initialized/installed. Processing begins at a first step 302 where the agents are installed. Following the first step 302 is a second step 304 where the server receives information from the newly installed agents. The information that the server receives from each of the agents includes an identifier for the agent along with data indicating what the agent is capable of monitoring.

Following step 304 is a step 306 where the table entry for the information received by each of the agents is created. As discussed above, each entry in the table 280 includes an element identifier, an operation identifier, and agent information. The element and operation may correspond to the information received at the step 304. Similarly, the agent identifier field may include the information received at the step 304. An indication of whether the agent is a primary or secondary may be provided in connection with user-defined configuration parameters. Alternatively, an algorithm may be used to determine dynamically whether an agent is a primary or secondary agent. For example, the algorithm could indicate that the first element that is received for performing a particular operation is deemed the primary while all other information received corresponding to the same element and operation will be deemed secondary. Other algorithms may also be used.

Also provided at the step 306 is the information in the table entry related to the cost for using the agent. The cost may be a quantity that is used when the agent is promoted from a secondary to a primary to determine which agent to promote from secondary to primary. The cost may be determined using any reasonable heuristic, such as determining the amount of processing time required for the agent to perform the operation for the element indicated by the table entry. Other means for determining cost may also be used. In any event, the cost is provided in the table entry created at the step 306.

Following the step 306 is a test step 308 which determines if there is more data being provided from more agents. If not, then processing is complete. Otherwise, control passes from a step 308 back to the step 304, to continue processing, as discussed above.

Figure 20:
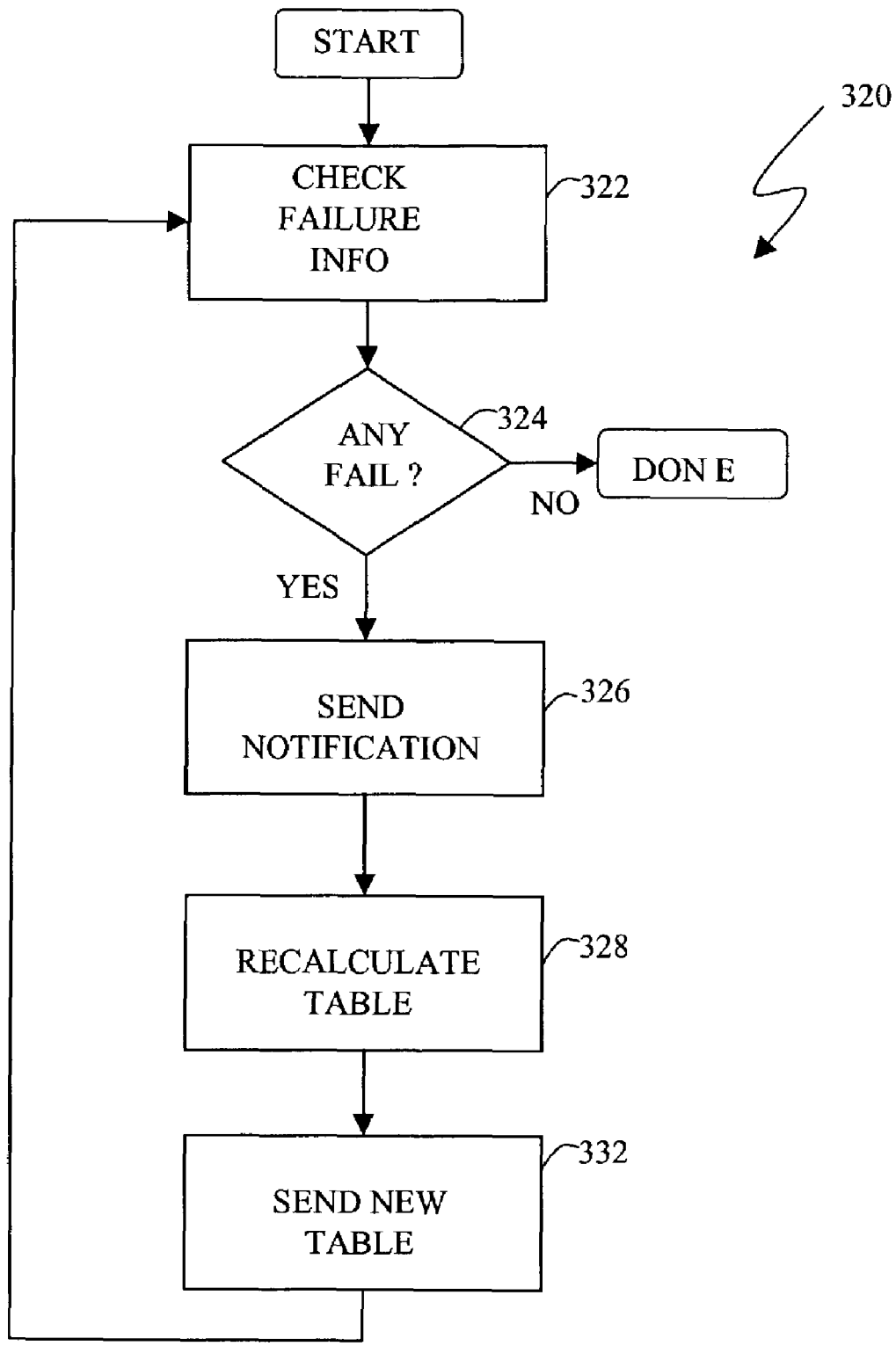
FIG. 20 is a flow chart illustrating steps for handling failure of an agent of a program used to monitor and control operation of a SAN according to the system described herein.

Referring to FIG. 20, a flow chart 320 illustrates steps performed in connection with failure of a primary agent and promotion of a secondary agent to a primary agent. Processing begins at a first step 322 where the server 184 checks to see if any of the primary agents have failed. The check at the step 322 may be performed by any one of a variety of mechanisms, including polling each of the agents and receiving status information back from the agents indicating health or, in the event that an agent does not respond, determining that the agent has failed. Following the step 322 is a test step 324 which determines if any agents have failed. If not, then processing is complete. Note that steps of the flow chart 320 may be run by the server 184 periodically to determine if any agents have failed.

If it is determined at the test step 322 that a particular agent has failed, control passes from the step 324 to a step 326 where the server 184 sends notification information to processes and/or objects that are to be notified that the agent has failed. For example, if the primary agent runs on a particular storage device, the storage device may be notified that the agent has failed. Similarly, the database 186 may contain configuration information which may need to be adjusted in connection with the agent failing.

Following the step 326 is a step 328 where the table 280 is recalculated to reflect that a primary agent has been eliminated. Part of the recalculation includes promoting one of the secondary agents to a primary agent. As discussed above, this may be performed by selecting the secondary agent that performs the same operation on the same element and has the lowest cost relative to other similar secondary agents. Once the table 280 has been recalculated, control passes from a step 328 to a step 322 where the new data from the table 280 is provided to each of the objects and/or processes that require the information. For example, the object that was monitored by the failed primary agent may be notified at the step 332. In addition, the database 186 may contain configuration data that needs to be modified in connection with recalculation of the table 280 at the step 328. Following the step 332, control passes back to the step 322 to receive more failure information (if necessary) followed by the step 324 to determine if any other agents have failed, as discussed above.

While the invention has been disclosed in connection with various embodiments, modifications thereon will be readily apparent to those skilled in the art. Accordingly, the spirit and scope of the invention is set forth in the following claims.

What is claimed is:

1. A method of collecting data for a storage area network, comprising:

providing a plurality of agents that collect data from objects of the storage area network; providing a plurality of data collection policies, wherein each of the policies indicates a type of data to be collected and a frequency of collection; and applying the policies to the agents, whereby the agents collect data according to the type of data and the frequencies indicated by the data collection policies, wherein at least one of the agents has a plurality of data collection policies applied thereto to cause the at least one agent to collect the types of data at the frequencies indicated by the merge of all of the data collection policies applied to the at least one agent.

2. A method, according to claim 1, wherein merging the data collection policies is performed by the at least one of the agents that receives the data collection policies.

3. A method, according to claim 1, wherein merging the data collection policies is performed by an entity other than the at least one of the agents.

4. A method, according to claim 1, further comprising:

displaying to a user at least one of the data collection policies for at least one of the agents.

5. A method, according to claim 4, further comprising:

allowing the user to modify the at least one data collection policy for the at least one of the agents.

6. A method, according to claim 5, further comprising:

in response to a user modifying the at least one data collection policy, providing the at least one data collection policy to the at least one agent.

7. A method, according to claim 6, wherein allowing a user to modify the at least one data collection policy includes allowing a user to delete the at least one data collection policy.

8. A method, according to claim 5, further comprising:

in response to a user modifying the at least one data collection policy, providing to the at least one agent all of the data collection policies for the at least one agent.

9. A method, according to claim 5, wherein allowing the user to modify the at least one data collection policy includes allowing the user to select one or more of the agents to which the at least one data collection policy is to be applied.

10. A method, according to claim 9, wherein the user is restricted to applying the at least one data collection policy to only agents of an appropriate type.

11. A method, according to claim 5, wherein allowing the user to modify the at least one data collection policy includes having the user modify a template for the at least one data collection policy.

12. A method, according to claim 1, wherein applying the policies to the agents overrides any of the agents' built-in data collection policies.

13. A method, according to claim 1, wherein each of the data collection policies are applicable to a single agent, a group of agents, or agents that service a particular type of object of the storage area network.

14. A method, according to claim 1, further comprising:
at least one of the agents maintaining a local copy of the data collection policies applied thereto.

15. Computer software, stored in a computer-readable medium, that collects data for a storage area network, comprising:
a plurality of executable code software agents that collect data from objects of the storage area network;
executable code that manages a plurality of data collection policies, wherein each of the policies indicates a type of data to be collected and a frequency of collection; and
executable code that applies the policies to the agents, whereby the agents collect data
according to the type of data and the frequencies indicated by the data collection policies, wherein at least one of the agents has a plurality of data collection policies applied thereto to cause the at least one agent to collect the types of data at the frequencies indicated by the merge of all of the data collection policies applied to the at least one agent.

16. Computer software, according to claim 15, wherein at least one of the agents includes executable code to merge the data collection policies applied thereto.

17. Computer software, according to claim 15, further comprising:
executable code to display to a user at least one of the data collection policies for at least one of the agents.

18. Computer software, according to claim 17, further comprising:
executable code to allow the user to modify the at least one data collection policy for the at least one of the agents.

19. Computer software, according to claim 18, further comprising:
executable code that provides the at least one data collection policy to the at least one agent in response to a user modifying the at least one data collection policy.

20. Computer software, according to claim 19, further comprising:
executable code that allows a user to delete the at least one data collection policy.

21. Computer software, according to claim 18, further comprising:
executable code that provides to the at least one agent all of the data collection policies for the at least one agent in response to a user modifying the at least one data collection policy.

22. Computer software, according to claim 18, further comprising:
executable code that allows the user to select one or more of the agents to which the at least one data collection policy is to be applied.

23. Computer software, according to claim 22, further comprising:
executable code that restricts the user to applying the at least one data collection policy to only agents of an appropriate type.

24. Computer software, according to claim 18, further comprising:
executable code that facilitates the user modify a template for the at least one data collection policy.

25. Computer software, according to claim 15, wherein the agents include executable code that overrides any of the agents' built-in data collection policies.

26. Computer software, according to claim 15, further comprising:
executable code for applying each of the data collection policies to a single agent, a group of agents, or agents that service a particular type of object of the storage area network.

* * * * *